US008509796B2

(12) United States Patent
Lee et al.

(10) Patent No.: US 8,509,796 B2
(45) Date of Patent: Aug. 13, 2013

(54) CARRIER AGGREGATION MANAGEMENT METHOD, SYSTEM AND DEVICES

(75) Inventors: Young Dae Lee, Seoul (KR); Sung Duck Chun, Seoul (KR); Seung June Yi, Seoul (KR); Sung Jun Park, Seoul (KR); Sung Hoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 409 days.

(21) Appl. No.: 12/840,154

(22) Filed: Jul. 20, 2010

(65) Prior Publication Data

US 2011/0028148 A1 Feb. 3, 2011

Related U.S. Application Data

(60) Provisional application No. 61/229,266, filed on Jul. 28, 2009.

(51) Int. Cl.
*H04W 36/00* (2009.01)
(52) U.S. Cl.
USPC ........ 455/452.1; 455/436; 455/437; 455/438; 455/439; 370/331

(58) Field of Classification Search
USPC .............. 455/452.1, 436–439; 370/218–219, 370/254, 329
See application file for complete search history.

(56) References Cited

U.S. PATENT DOCUMENTS

| 2010/0113010 A1* | 5/2010 | Tenny et al. | 455/423 |
| 2010/0232373 A1* | 9/2010 | Nory et al. | 370/329 |
| 2010/0234037 A1* | 9/2010 | Terry et al. | 455/450 |

* cited by examiner

*Primary Examiner* — Ajit Patel
*Assistant Examiner* — Julio Perez
(74) *Attorney, Agent, or Firm* — Lee, Hong, Degerman, Kang & Waimey (57) ABSTRACT

Method, system and devices for managing carrier aggregation in a radiocommunication system. According to the method, the user equipment (3) carries out the steps of: receiving (7;12) a list of multiple carriers in a determined order; and selecting (9;14) one carrier from the list of multiple carriers as a serving carrier, based on a position of said carrier in the list of multiple carriers.

7 Claims, 6 Drawing Sheets

CARRIER AGGREGATION MANAGEMENT METHOD, SYSTEM AND DEVICES

CROSS-REFERENCE TO RELATED APPLICATIONS

This application claims the benefit of U.S. Provisional Application No. 61/229,266, filed on Jul. 28, 2009.

BACKGROUND

1. Technical Field

The present invention relates to carrier aggregation management in a radiocommunication system.

2. Related Art

Many different types of radiocommunication systems (i.e. networks) exist. GSM, UMTS, LTE and LTE-advanced are non-limiting examples of such radiocommunication systems.

Figure 1:
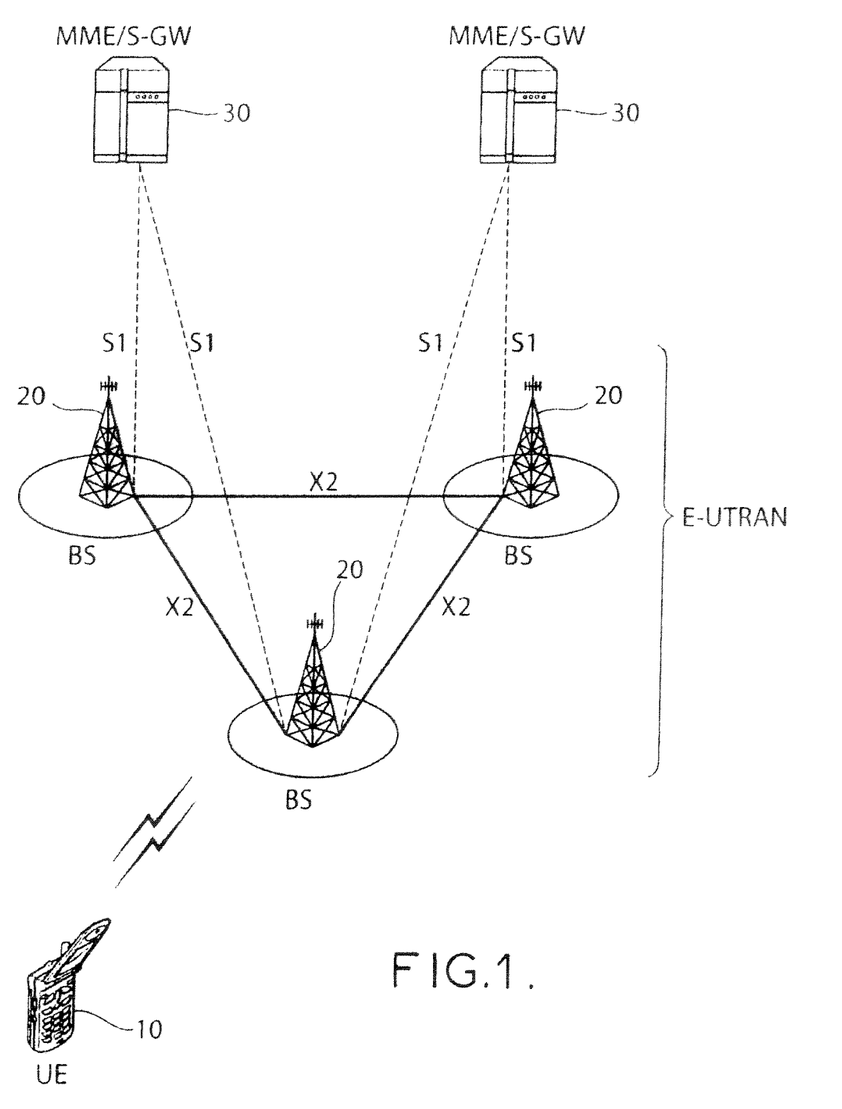
FIG. 1 is a diagram showing an exemplary radiocommunication system.

FIG. 1 is a block diagram showing a radiocommunication system. This may be a network structure of a 3rd generation partnership project (3GPP) long term evolution (LTE)/LTE-advanced (LTE-A). An E-UTRAN (Evolved-UMTS Terrestrial Radio Access Network) includes at least one base station (BS) 20 providing a user plane and a control plane towards a user equipment (UE) 10. The UE can be fixed or mobile and can be referred to as another terminology, such as a MS (Mobile Station), a UT (User Terminal), a SS (Subscriber Station), MT (mobile terminal), a wireless device, or the like. The BS 20 may be a fixed station that communicates with the UE 10 and can be referred to as another terminology, such as an e-NB (evolved-NodeB), a BTS (Base Transceiver System), an access point, or the like. There are one or more cells within the coverage of the BS 20. Interfaces for transmitting user traffic or control traffic can be used between BSs 20. The BSs 20 are interconnected with each other by means of an X2 interface. The BSs 20 are also connected by means of the S1 interface to the EPC (Evolved Packet Core). They may interface to the aGW (E-UTRAN Access Gateway) via the S1. In the example shown in FIG. 1, the BSs 20 are more specifically connected to the MME (Mobility Management Entity) by means of the S1-MME and to the Serving Gateway (S-GW) by means of the S1-U. The S1 interface supports a many-to-many relation between MME/S-GW 30 and the BS 20.

Hereinafter, downlink means communication from the BS 20 to the UE 10, and uplink means communication from the UE 10 to the BS 20. In downlink, a transmitter may be a part of the BS 20 and a receiver may be a part of the UE 10. In uplink, a transmitter may be a part of the UE 20 and a receiver may be a part of the BS 20.

Figure 2:
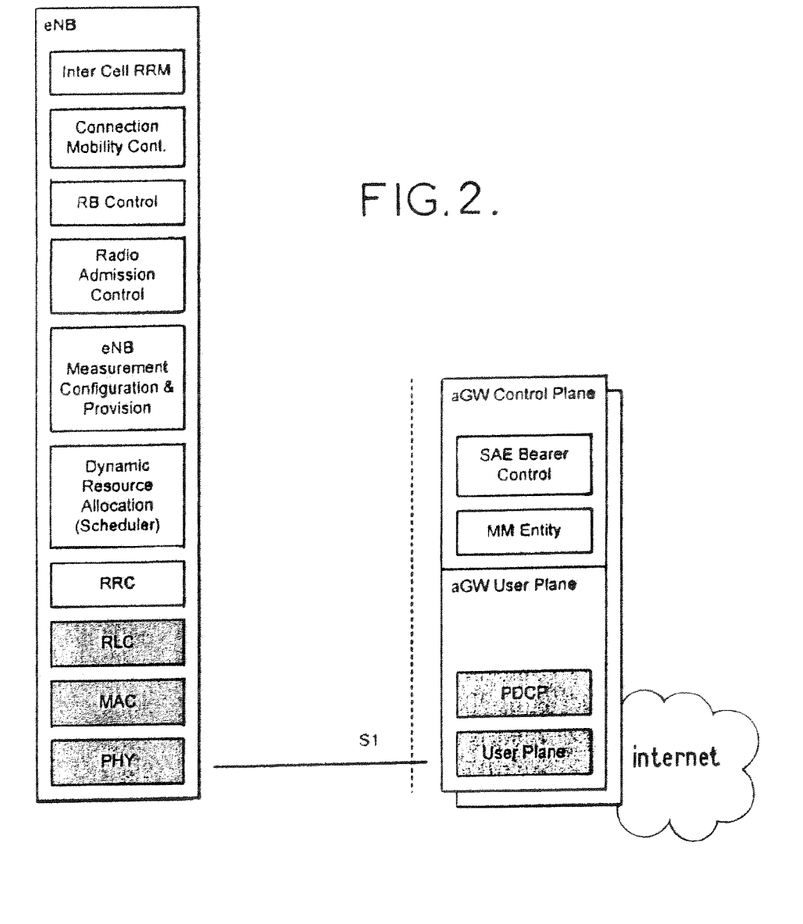
FIG. 2 is a diagram showing an exemplary overview of an E-UTRAN architecture.

FIG. 2 gives an overview of the E-UTRAN architecture where:

eNB, aGW Control Plane and aGW User Plane boxes depict the logical nodes;

The boxes within the eNB box from RRC to Inter Cell RRM as well as the boxes SAE Bearer Control and MM Entity within the aGW Control Plane box depict the functional entities of the control plane; and The boxes within the eNB box from PHY to RLC depict the functional entities of the user plane.

Functions agreed to be hosted by the eNB are: Selection of aGW at attachment; Routing towards aGW at RRC activation; Scheduling and transmission of paging messages; Scheduling and transmission of BCCH information; Dynamic allocation of resources to UEs in both uplink and downlink; The configuration and provision of eNB measurements; Radio Bearer Control; Radio Admission Control; Connection Mobility Control in LTE ACTIVE state.

Functions agreed to be hosted by the aGW are: Paging origination; LTE_IDLE state management; Ciphering of the user plane; PDCP; SAE Bearer Control; Ciphering and integrity protection of NAS signaling.

Figure 3:
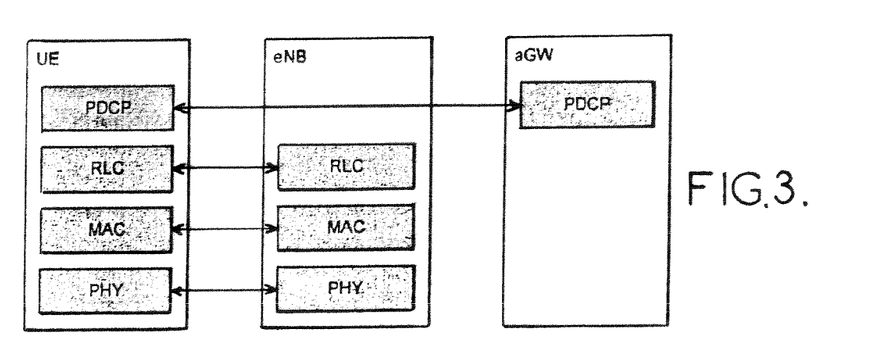
FIG. 3 is a diagram showing an exemplary user-plane protocol stack for E-UTRAN.

FIG. 3 shows the user-plane protocol stack for E-UTRAN.

RLC (Radio Link Control) and MAC (Medium Access Control) sublayers (terminated in eNB on the network side) perform the functions such as Scheduling, ARQ (automatic repeat request) and HARQ (hybrid automatic repeat request).

PDCP (Packet Data Convergence Protocol) sublayer (terminated in aGW on the network side) performs for the user plane functions such as Header Compression, Integrity Protection, Ciphering.

Figure 4:
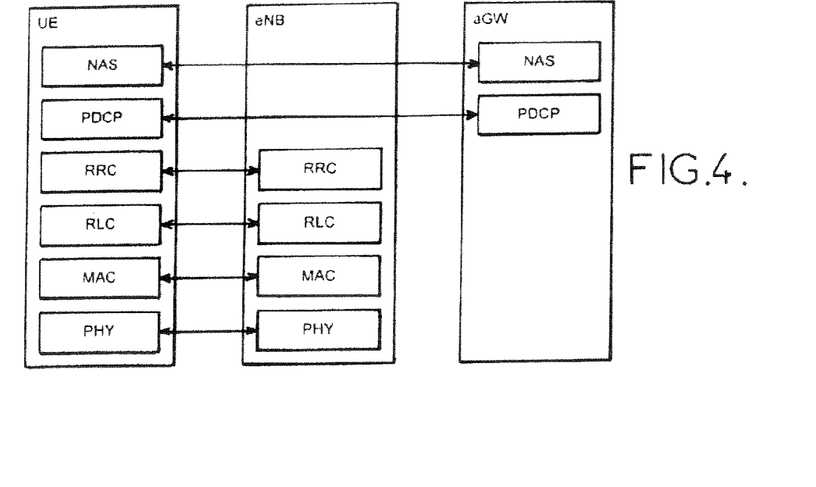
FIG. 4 is a diagram showing an exemplary control-plane protocol stack for E-UTRAN.

FIG. 4 shows the control-plane protocol stack for E-UTRAN. The following working assumptions apply.

RLC and MAC sublayers (terminated in eNB on the network side) perform the same functions as for the user plane;

RRC (Radio Resource Control) (terminated in eNB on the network side) performs the functions such as: Broadcast; Paging; RRC connection management; RB control; Mobility functions; UE measurement reporting and control.

PDCP sublayer (terminated in aGW on the network side) performs for the control plane the functions such as: Integrity Protection; Ciphering.

NAS (terminated in aGW on the network side) performs among other things: SAE bearer management; Authentication; Idle mode mobility handling; Paging origination in LTE_IDLE; Security control for the signaling between aGW and UE, and for the user plane.

RRC uses the following states:

1. RRC_IDLE:
   UE specific DRX configured by NAS; Broadcast of system information; Paging; Cell re-selection mobility; The UE shall have been allocated an id which uniquely identifies the UE in a tracking area; No RRC context stored in the eNB.

2. RRC_CONNECTED:
   UE has an E-UTRAN-RRC connection; UE has context in E-UTRAN; E-UTRAN knows the cell which the UE belongs to; Network can transmit and/or receive data to/from UE; Network controlled mobility (handover); Neighbour cell measurements; At RLC/MAC level: UE can transmit and/or receive data to/from network; UE also reports channel quality information and feedback information to eNB.

The network signals UE specific paging DRX (Discontinuous Reception) cycle. In RRC Idle mode, UE monitors a paging at a specific paging occasion of every UE specific paging DRX cycle. The paging occasion is a time interval where a paging is transmitted. UE has its own paging occasion. A paging message is transmitted over all cells belonging to the same tracking area. If UE moves from a tracking area to another tracking area, UE will send a tracking area update message to the network to update its location.

Figure 5:
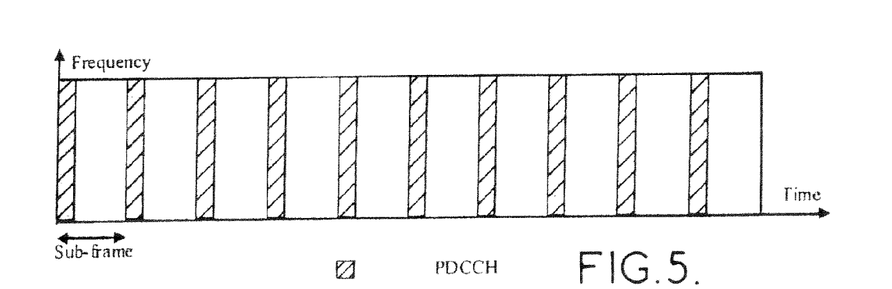
FIG. 5 is a diagram schematically showing a PDCCH channel arrangement.

A physical channel transfers signaling and data between UE L1 and eNB L1. As shown in FIG. 5, the physical channel transfers them with a radio resource which consists of one or more sub-carriers in frequency and one more symbols in time. 6 or 7 symbols constitute one sub-frame which is 0.5 ms in length. The particular symbol(s) of the sub-frame, e.g. the first symbol of the sub-frame, can be used for the PDCCH (Physical Downlink Control Channel). PDCCH channel carries L1 signaling.

A transport channel transfers signaling and data between L1 and MAC layers. A physical channel is mapped to a transport channel.

Downlink transport channel types are:

1. Broadcast Channel (BCH) used for transmitting system information
2. Downlink Shared Channel (DL-SCH) characterised by: support for HARQ; support for dynamic link adaptation by varying the modulation, coding and transmit power; possibility to be broadcast in the entire cell; possibility to use beamforming; support for both dynamic and semi-static resource allocation
3. Paging Channel (PCH) used for paging a UE
4. Multicast Channel (MCH) used for multicast or broadcast service transmission.

Uplink transport channel types are:

1. Uplink Shared Channel (UL-SCH) characterised by: possibility to use beamforming; (likely no impact on specifications); support for dynamic link adaptation by varying the transmit power and potentially modulation and coding; support for HARQ
2. Random Access Channel(s) (RACH) used normally for initial access to a cell.

The MAC sublayer provides data transfer services on logical channels. A set of logical channel types is defined for different kinds of data transfer services as offered by MAC. Each logical channel type is defined by what type of information is transferred.

A general classification of logical channels is into two groups:

Control Channels (for the transfer of control plane information);

Traffic Channels (for the transfer of user plane information).

Control channels are used for transfer of control plane information only. The control channels offered by MAC are:

Broadcast Control Channel (BCCH)
A downlink channel for broadcasting system control information Paging Control Channel (PCCH)
A downlink channel that transfers paging information. This channel is used when the network does not know the location cell of the UE.

Common Control Channel (CCCH)
this channel is used by the UEs having no RRC connection with the network.

Multicast Control Channel (MCCH)
A point-to-multipoint downlink channel used for transmitting MBMS control information from the network to the UE.

Dedicated Control Channel (DCCH)
A point-to-point bi-directional channel that transmits dedicated control information between a UE and the network. Used by UEs having an RRC connection.

Traffic channels are used for the transfer of user plane information only. The traffic channels offered by MAC are:

Dedicated Traffic Channel (DTCH)
A Dedicated Traffic Channel (DTCH) is a point-to-point channel, dedicated to one UE, for the transfer of user information. A DTCH can exist in both uplink and downlink.

Multicast Traffic Channel (MTCH)
A point-to-multipoint downlink channel for transmitting traffic data from the network to the UE.

In Uplink, the following connections between logical channels and transport channels exist:

DCCH can be mapped to UL-SCH;
DTCH can be mapped to UL-SCH.

In Downlink, the following connections between logical channels and transport channels exist:

BCCH can be mapped to BCH;
PCCH can be mapped to PCH;
DCCH can be mapped to DL-SCH;
DTCH can be mapped to DL-SCH;
MCCH can be mapped to MCH;
MTCH can be mapped to MCH;

Conventionally, only one carrier (i.e. a physical resource) is used at a time with respect to a given UE for transporting information, such as useful information and/or control information.

Depending on the multiple access type (TDMA, FDMA, CDMA, OFDMA, etc.) of the considered radio communication system, this single carrier can take the form of one frequency, one time slot, one code, any combination thereof, or other.

But for supporting wider transmission bandwidths, it would be better to use carrier aggregation, that is simultaneous support of multiple carriers. Carrier aggregation would thus involve transporting information, such as useful information and/or control information, over a plurality of carriers with respect to a given UE. It would thus enhance the conventional carrier usage and be adapted to the multiple access type of the considered radio communication system.

As far as LTE is concerned, carrier aggregation has been introduced in a recent version thereof, so-called LTE-Advanced, which extends LTE Release 8 (LTE Rel-8). Some aspects of carrier aggregation are disclosed for example in 3GPP TR 36.814 V0.4.1, 3rd Generation Partnership Project; Technical Specification Group Radio Access Network; Further Advancements for E-UTRA Physical Layer Aspects (Release 9) released in February 2009 (see section 5 in particular).

Thus LTE-Advanced allows having two or more carriers, so-called component carriers (CCs), aggregated in order to support wider transmission bandwidths e.g. up to 100 MHz and for spectrum aggregation.

It shall be possible to configure all component carriers which are LTE Rel-8 compatible, at least when the aggregated numbers of component carriers in the uplink (UL) and the downlink (DL) are same. Not all component carriers may necessarily be LTE Rel-8 compatible.

A terminal may simultaneously receive or transmit on one or multiple component carriers depending on its capabilities:

An LTE-Advanced terminal with reception and/or transmission capabilities for carrier aggregation can simultaneously receive and/or transmit on multiple component carriers;

An LTE Rel-8 terminal can receive and transmit on a single component carrier only, provided that the structure of the component carrier follows the Rel-8 specifications.

According to a non-limiting example, a carrier may be defined by a bandwidth and a center frequency. If five carriers are assigned as granularity of carrier unit having a 5 MHz bandwidth, carrier aggregation may lead to a bandwidth of a maximum of 20 MHz.

Contiguous spectrum aggregation and/or non-contiguous spectrum aggregation may take place. The contiguous spectrum aggregation uses contiguous carriers and the non-contiguous spectrum aggregation uses discontiguous carriers. The number of aggregated carriers may be different in uplink and downlink. When the number of downlink carriers and that of uplink carriers are equal, it is called a symmetric aggregation, and when the numbers are different, it is called an asymmetric aggregation.

The size (i.e., the bandwidth) of multiple carriers may vary. For example, when five carriers are used to configure a 70 MHz band, they may be configured as 5 MHz carrier (carrier #0)+20 MHz carrier (carrier #1)+20 MHz carrier (carrier #2)+20 MHz carrier (carrier #3)+5 MHz carrier (carrier #4).

Figure 6:
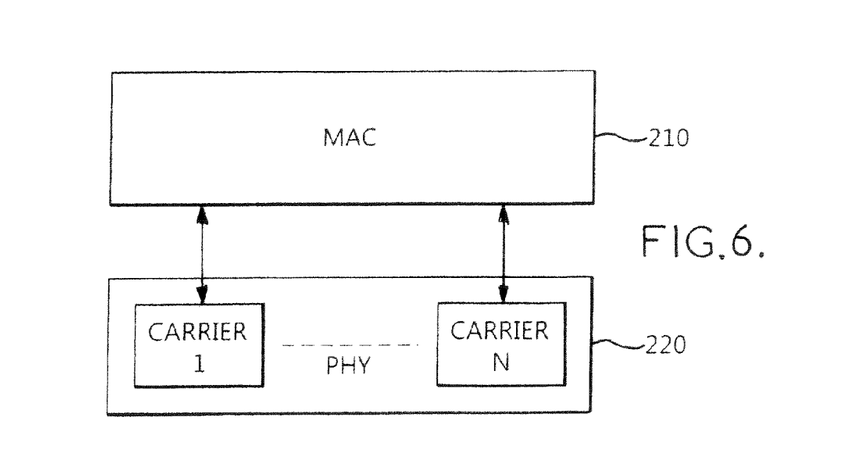
FIG. 6 is a diagram showing an exemplary protocol structure for supporting multiple carriers (carrier aggregation)

FIG. 6 illustrates an example of a protocol structure for supporting multiple carriers. A common medium access control (MAC) entity 210 manages a physical (PHY) layer 220 which uses a plurality of carriers. A MAC management message transmitted by a particular carrier may be applied to other carriers. The PHY layer 220 may operate e.g. in a TDD (Time Division Duplex) and/or FDD (Frequency Division Duplex) scheme.

There are several physical control channels used in the physical layer 220. A physical downlink control channel (PDCCH) may inform the UE about the resource allocation of paging channel (PCH) and downlink shared channel (DL-SCH), and hybrid automatic repeat request (HARQ) information related to DL-SCH. The PDCCH may carry the uplink scheduling grant which informs the UE about resource allocation of uplink transmission. A physical control format indicator channel (PCFICH) informs the UE about the number of OFDM symbols used for the PDCCHs and is transmitted in every subframe. A physical Hybrid ARQ Indicator Channel (PHICH) carries HARQ ACK/NAK signals in response to uplink transmissions. A physical uplink control channel (PUCCH) carries uplink control information such as HARQ AC/NAK in response to downlink transmission, scheduling request and channel quality indicator (CQI). A physical uplink shared channel (PUSCH) carries uplink shared channel (UL-SCH).

Figure 7:
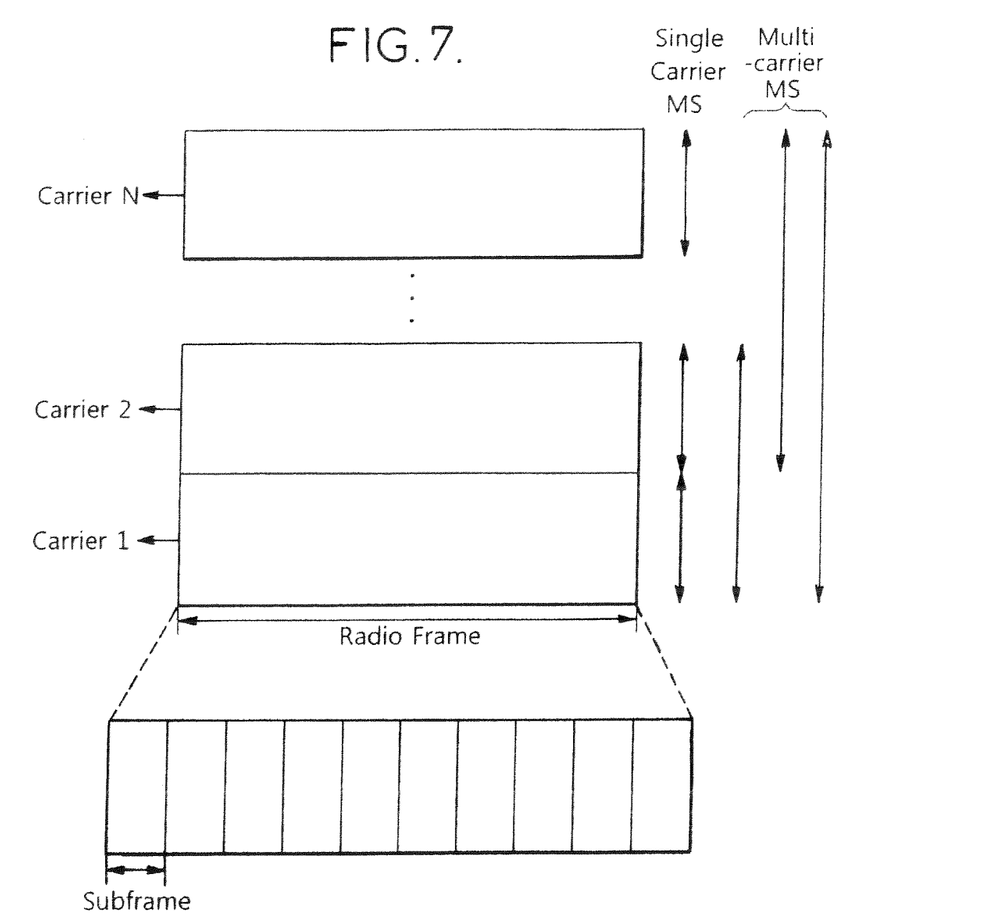
FIG. 7 is a diagram showing an exemplary frame structure for operating multiple carriers (carrier aggregation)

FIG. 7 illustrates an example of a frame structure for operating multiple carriers. A radio frame includes 10 subframes. Each carrier may have its own control channel, i.e. PDCCH. Some carriers may have only a portion of the SFH. Multiple carriers may be or may not be contiguous to each other. A UE may support one or more carriers according to its capability.

Carriers may be divided into a primary carrier (PCC), also called a serving carrier in the following, and a secondary carrier depending on whether they are activated. The primary carrier refers to a carrier that is constantly activated, and the secondary carrier refers to a carrier that is activated or deactivated according to particular conditions. Activation means that transmission or reception of traffic data is performed or traffic data is ready for its transmission or reception. Deactivation means that transmission or reception of traffic data is not permitted. In the deactivation, measurement is made or minimum information can be transmitted or received. The UE uses only a single primary carrier or one or more secondary carriers along with the primary carrier.

A primary carrier is a carrier used by a BS to exchange traffic and PHY/MAC control signaling (e.g. MAC control messages) with a UE. Secondary carriers are additional carriers which the UE may use for traffic, only per BS's specific commands and rules received on the primary carrier. The primary carrier may be a fully configured carrier, by which major control information is exchanged between the BS and the UE. The secondary carrier may be a fully configured carrier or a partially configured carrier, which is allocated according to a request of the UE or according to an instruction of the BS. The primary carrier may be used for entering of the UE into a network or for an allocation of the secondary carrier. The primary carrier may be selected from among fully configured carriers, rather than being fixed to a particular carrier. A carrier set as the secondary carrier may be changed to a primary carrier.

A primary carrier may further may have at least some of the following characteristics:
    to be in accordance with the definitions of the PCC introduced in Rel-10 CA;
    uplink PCC and downlink PCC may be configured per UE;
    uplink PCC may be used for transmission of L1 uplink control information;
    downlink PCC cannot be de-activated;
    re-establishment may be triggered when the downlink PCC experiences RLF (radio link failure), not when other downlink CC's experience RLF;
    SI (system information) reception for the downlink PCC, Rel-8 procedures may apply;
    this may not imply anything for the reception of the SI of other configured CC's;
    NAS information may be taken from the downlink PCC cell.

A problem arises with carrier aggregation because some control information may be transmitted or received on only one among the aggregated component carriers, namely a primary carrier. On the other hand, a given UE may be able to receive or transmit control information on one component carrier only at a time. So, if the UE and the radiocommunication system do not use the same component carrier for control information reception/transmission, at least part of the control information may be lost.

As an example, a terminal may receive a handover command from a serving cell and then move to a target cell based on the received handover command.

If multiple component carriers (CC) are aggregated together, the terminal may receive the handover command including multiple CCs as a target. In this case, the terminal cannot know on which target CC it will receive control information such as paging. If the CC where the terminal receives paging is different from the CC where the network sends paging for the terminal, the terminal may lose signaling or data from the network.

To overcome this problem, the UE may be explicitly assigned the primary carrier and/or the second carriers by the BS. However, the transmission of that information generates signaling and/or overhead.

SUMMARY

To improve this situation, the invention proposes a method of managing carrier aggregation in a radiocommunication system. The method comprises the following steps carried out by a user equipment:
    receiving a list of multiple carriers in a determined order;
    selecting one carrier from the list of multiple carriers as a serving carrier, based on a position of said carrier in the list of multiple carriers.

The ordered list constitutes an implicit indication of the carrier to be selected as a serving carrier by the user equipment. This selection avoids explicit indication which would introduce signaling and/or overhead.

According to advantageous embodiments which may be combined in any suitable way:
    the method further comprises receiving or transmitting control information on the selected carrier before receiving or transmitting control information on the other carriers in the list of multiple carriers;
    the list of multiple carriers is received in a handover command message and lists multiple target carriers;
    the list of multiple carriers is received from a carrier which is not included in said list of multiple carriers;

the selected carrier is the carrier in the first position in the list of multiple carriers;

the list of multiple carriers lists multiple downlink carriers;

control information is received on the selected carrier before receiving on the other carriers in the list of multiple carriers and includes system information;

control information is received on the selected carrier before receiving on the other carriers in the list of multiple carriers and is included in a physical downlink control channel;

control information is received on the selected carrier before receiving on the other carriers in the list of multiple carriers and includes paging;

the list of multiple carriers lists multiple uplink carriers; and/or control information is transmitted on the selected carrier before transmitting on the other carriers in the list of multiple carriers and includes a handover complete message.

The invention also proposes a user equipment arranged for managing carrier aggregation in cooperation with a radiocommunication system according to the above mentioned method, the user equipment comprising:

a reception unit for receiving a list of multiple carriers in a determined order;

a selection unit for selecting one carrier from the list of multiple carriers as a serving carrier, based on a position of said carrier in the list of multiple carriers.

The invention also proposes a radiocommunication system for managing carrier aggregation in cooperation with a user equipment as mentioned above, the radiocommunication system comprising:

a list building unit for building a list of multiple carriers in a determined order, said determined order being set so that the user equipment can select one given carrier from the list of multiple carriers as a serving carrier based on a position of said given carrier in the list of multiple carriers;

a transmission unit for transmitting the list of multiple carriers to the user equipment.

The invention also proposes a base station in a radiocommunication system for managing carrier aggregation in cooperation with a user equipment as mentioned above, the base station comprising:

a list building unit for building a list of multiple carriers in a determined order, said determined order being set so that the user equipment can select one given carrier from the list of multiple carriers as a serving carrier based on a position of said given carrier in the list of multiple carriers;

a transmission unit for transmitting the list of multiple carriers to the user equipment.

DESCRIPTION OF EXEMPLARY EMBODIMENTS

The invention will be described hereafter in the context of an LTE-A system supporting carrier aggregation as mentioned above. It applies however to any other type of radiocommunication system as will appear to one skilled in the art.

According to an aspect of the invention, a user equipment receives a list of multiple carriers in a determined order and selects one carrier from the list of multiple carriers as a serving carrier, based on a position of said carrier in the list of multiple carriers. As far as LTE-A carrier aggregation is concerned, such serving carrier may be a primary component carrier (PCC) as defined above.

Figure 8:
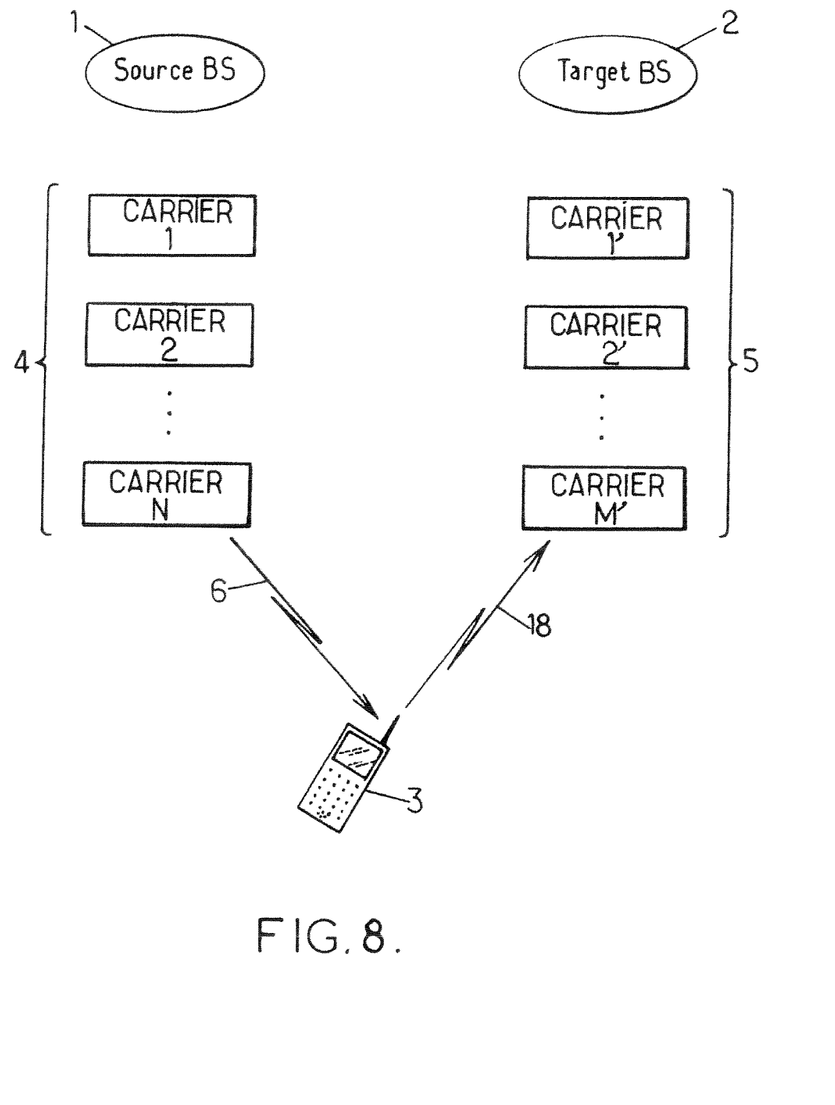
FIG. 8 is a diagram showing an exemplary and non-limiting embodiment of the invention in the context of a handover.

The example shown in FIG. 8 relates to a non-limiting embodiment of the invention in the context of a handover.

In this example, a UE 3 is first in communication with a source BS 1, via one carrier or several carriers (if carrier aggregation takes place with the source BS 1) among the carriers 1, 2, . . . , N (reference 4).

When a handover must take place for the UE 3 from the source BS 1 to the target BS 2, the UE 3 receives a handover command message 6 from the source BS 1 as is conventional. This handover command message 6 is sent over one or several carriers 4.

In the present example, the handover command message 6 includes a list of multiple carriers which are target aggregated carriers relating to the target BS 2 to take over the communication. This list thus comprises an indication for the carriers 1', 2', . . . , M' (reference 5) in a determined order, that is carrier 1', then carrier 2', . . . , and then carrier M'.

The carrier indication may take any possible form, such as a number of each carrier (1', 2', . . . , M'), a characteristic of each carrier (an indication of a frequency, a time slot, a code, a combination thereof, etc.), or other. In any case, the information provided in the list should be sufficient to identify each carrier.

So in the present case, the list of multiple carriers is sent by the source BS 1 and received by the UE 3 over a carrier which is not included in the list. Also, although the list is sent here by a BS, it may be sent by another entity in the radiocommunication system having an appropriate transmission unit therefor.

The handover command message 6 does not include an explicit designation of a carrier that could be used for the UE 3 as a serving carrier, that is, with respect to LTE-A carrier aggregation, a primary carrier (PCC) as defined above.

On receiving the list of carriers 1', 2', . . . , M', the UE 3 selects one of those carriers as a serving carrier. This selection is based on a position of said carrier in the list of multiple carriers. For example, the UE 3 may select the carrier in first position in the received list, that is the carrier 1' in the present example.

Many other possibilities may be envisaged: for example the carrier in position p in the received list, where p is a determined integer between 1' and M', may be selected. The integer p may be the same for each selection, or it may vary from one selection to the following one. As an example, p may follow a cycle, such as 1', then 2', ..., and then M', or any other possibility.

The list is built accordingly by the source BS 1 or any other entity in the radiocommunication system having an appropriate unit therefor. In other words, the list is built with the knowledge that the carrier in first (or other) position in the list will be selected by the UE 3. So, if the radiocommunication system wishes that the carrier 1' be used by the UE 3 as a serving carrier, it will place it in first position in the list sent within the handover command message 6.

This correspondence between the list building in the radiocommunication system and the carrier selection in the UE makes it possible to define a serving carrier implicitly, that is without explicit information being sent for this purpose. Signaling and/or overhead is thus avoided.

The same mechanism can take place in a context which does not involve a handover. For example, if the UE 3 is attached to the BS 1 of FIG. 8, the BS 1 may send the list of multiple (aggregated) carriers 1, 2, ..., N, so that the UE 3 may select one of those carriers as a serving carrier based on its position in the list. This may occur for example after a reconfiguration takes place in the BS 1 and/or in the UE 3, after a communication involving the UE 3 starts, or in any other suitable circumstances. In this case, the carrier selected as a serving carrier may be one of the carriers via which the list of multiple carriers was received by the UE 3.

All or some of the carriers indicated in the list may be downlink carriers, i.e. carriers for carrying information sent from the radiocommunication system to the UE.

Alternatively or in addition, all or some of the carriers indicated in the list may be uplink carriers, i.e. carriers for carrying information sent from the UE to the radiocommunication system.

Once the UE 3 has received a list of multiple carriers and selected one serving carrier among the listed carriers, it may receive (in case of a downlink carrier) or transmit (in case of an uplink carrier) control information on said selected carrier before receiving or transmitting control information on the other carriers in the list.

In this way, the UE 3 and the radiocommunication system can use the same component carrier, that is the selected serving carrier (PCC), for control information reception/transmission. The risk, mentioned in the introduction, of control information being lost is thus considerably reduced if not eliminated.

Afterwards, when control information has been properly received/transmitted on the selected serving carrier (PCC), some other control information may be received/transmitted on other listed carriers later on.

In case the carriers in the list are downlink carriers, the control information received by the UE 3 on the selected carrier before receiving on the other listed carriers may include system information (SI).

As a variant or in addition, the control information received by the UE 3 on the selected carrier before receiving on the other listed carriers may be included in a physical downlink control channel (PDCCH).

Still as a variant or in addition, the control information received by the UE 3 on the selected carrier before receiving on the other listed carriers may include paging. The risk of missing a call may thus be considerably reduced if not eliminated.

In case the carriers in the list are uplink carriers, the control information transmitted by the UE 3 on the selected carrier before transmitting on the other listed carriers may include a handover complete message 18. In this way, the risk that a handover procedure cannot be achieved due to the handover complete message not being received by the radiocommunication system may thus be considerably reduced if not eliminated. This is because the radiocommunication system waits for the handover complete message precisely on the selected serving carrier.

Other type of control information transmitted or received first on the serving carrier may be envisaged instead or in addition to the examples above, as will appear to one skilled in the art.

Figure 9:
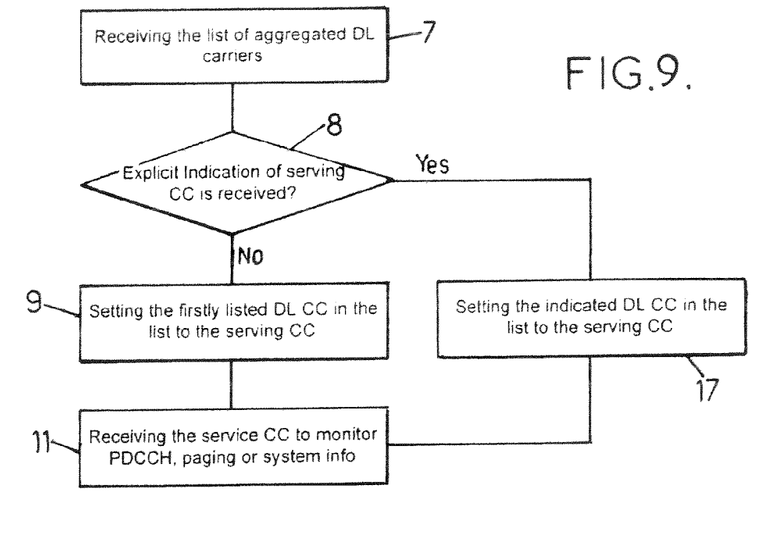
FIG. 9 is a diagram showing exemplary steps of how to select a serving downlink carrier according to a non-limiting embodiment of the invention.

FIG. 9 shows a non-limiting example of how to select the serving downlink carrier (DL CC) with respect to a given UE, according to an embodiment of the invention involving a handover.

If the handover (HO) command message includes the list of target aggregated DL CCs (step 7) and if no explicit indication of a target serving DL CC was received before or within the HO command message (step 8, 'No'), the UE selects e.g. the firstly listed DL CC in the list of the HO command message as the target serving CC (step 9) (any position in the list other than the first one may be used instead);

after moving to the target CCs, the UE monitors control information such as PDCCH or paging or receives system information on the target serving CC (step 11), for example until the radiocommunication system reconfigures the serving CC.

Else if explicit indication of a target serving DL CC was received before or within the HO command message (step 8, 'Yes'), the indicated DL CC is selected as the serving DL CC (step 17).

Figure 10:
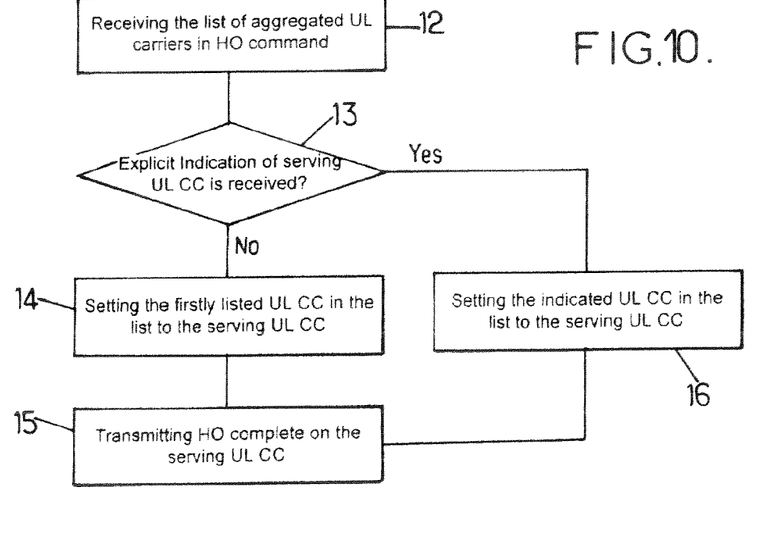
FIG. 10 is a diagram showing exemplary steps of how to select a serving uplink carrier according to a non-limiting embodiment of the invention.

FIG. 10 shows a non-limiting example of how to select the serving uplink carrier (UL CC) with respect to a given UE, according to an embodiment of the invention involving a handover.

If the HO command message includes the list of target aggregated UL CCs (step 12) and if no explicit indication of a target serving UL CC was received before or within the HO command message (step 13, 'No'), the UE selects e.g. the firstly listed UL CC in the list of the HO command message as the target serving UL CC (step 14) (any position in the list other than the first one may be used instead);

the UE transmits the HO complete message on the target serving UL CC (step 15).

Else if explicit indication of a target serving UL CC was received before or within the HO command message (step 13, 'Yes'), the indicated UL CC is selected as the serving UL CC (step 16) and the UE can transmit the HO complete message on said indicated target serving UL CC.

Other examples may also be envisaged within the framework of the present invention, as will appear to one skilled in the art.

We claim:

1. A method of managing carrier aggregation in a radio communication system by a user equipment, the method comprising:
   receiving a list of multiple carriers in a determined order, wherein the list of multiple carriers lists multiple downlink carriers;
   determining whether or not a serving carrier is explicitly indicated either within the received list of multiple carriers or before receiving the list of multiple carriers;
   selecting a carrier from the list of multiple carriers as the serving carrier if it is determined that the serving carrier is not explicitly indicated, the selection of the carrier based on a position of the carrier in the list of multiple carriers, wherein the position of the serving carrier is a first position in the list of multiple carriers; and receiving control information on the selected carrier before receiving on the other carriers in the list of multiple carriers, the received control information including system information or paging information.

2. The method of claim 1, further comprising receiving or transmitting control information on the selected carrier before receiving or transmitting control information on the other carriers in the list of multiple carriers.

3. The method as claimed in claim 2, wherein the list of multiple carriers is received from a carrier which is not included in said list of multiple carriers.

4. The method as claimed in claim 1, wherein the list of multiple carriers is received in a handover command message and lists multiple target carriers.

5. The method as claimed in claim 4, wherein the list of multiple carriers is received from a carrier which is not included in said list of multiple carriers.

6. A user equipment configured for managing carrier aggregation in cooperation with a radio communication system, the user equipment comprising:

a receiver configured to receive a list of multiple carriers in a determined order, wherein the list of multiple carriers lists multiple downlink carriers; and a processor configured to:

determine whether or not a serving carrier is explicitly indicated either within the received list of multiple carriers or before the list of multiple carriers is received;

select a carrier from the list of multiple carriers as the serving carrier if it is determined that the serving carrier is not explicitly indicated, the selection of the carrier based on a position of the carrier in the list of multiple carriers, wherein the position of the serving carrier is a first position in the list of multiple carriers; and receive control information on the selected carrier before receiving on the other carriers in the list of multiple carriers, the received control information including system information or paging information.

7. A method of managing carrier aggregation in a radio communication system by a user equipment, the method comprising:

receiving a list of multiple carriers in a determined order, wherein the list of multiple carriers lists multiple uplink carriers;

determining whether or not a serving carrier is explicitly indicated either within the received list of multiple carriers or before receiving the list of multiple carriers;

selecting a carrier from the list of multiple carriers as the serving carrier if it is determined that the serving carrier is not explicitly indicated, the selection of the carrier based on a position of the carrier in the list of multiple carriers, wherein the position of the serving carrier is a first position in the list of multiple carriers; and transmitting control information on the selected carrier before transmitting on the other carriers in the list of multiple carriers, the transmitted control information including a handover complete message.

* * * * *